Oct. 11, 1960
H. J. ATKINSON
2,955,923
APPARATUS FOR PURIFICATION AND TREATMENT
OF FEED WATER OR OTHER LIQUIDS
Filed Jan. 12, 1959
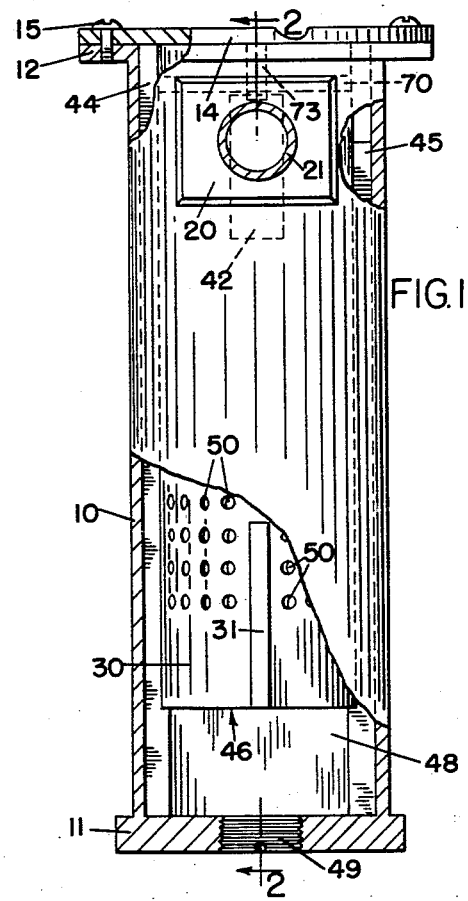
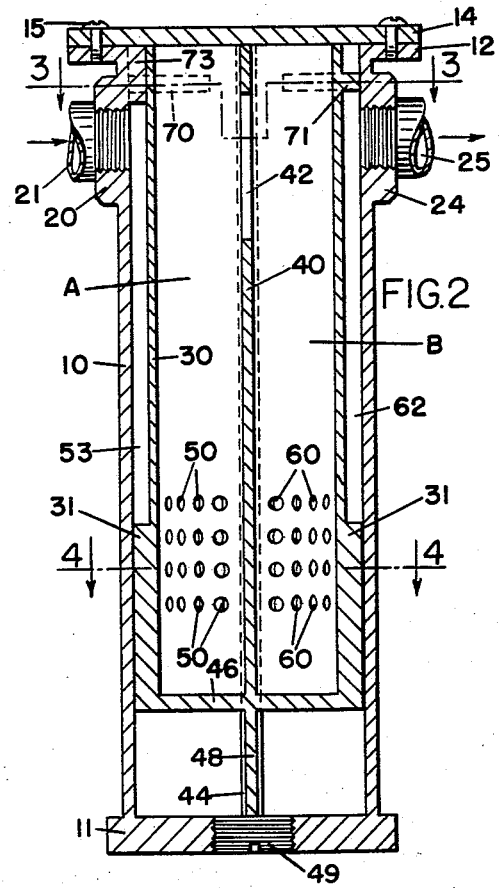
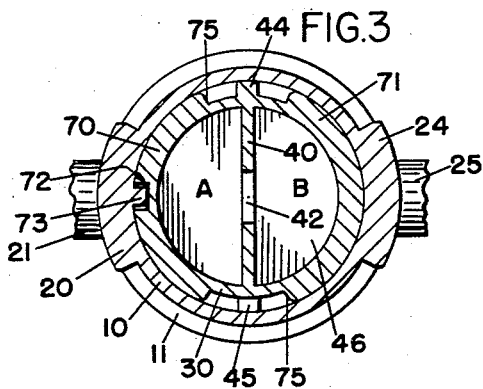
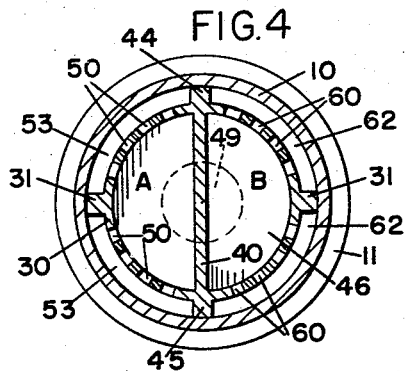
INVENTOR
HERBERT J. ATKINSON
ATTORNEY

United States Patent Office 2,955,923
Patented Oct. 11, 1960

2,955,923

APPARATUS FOR PURIFICATION AND TREATMENT OF FEED WATER OR OTHER LIQUIDS

Herbert J. Atkinson, % Sudbury Laboratory, Sudbury, Mass.

Filed Jan. 12, 1959, Ser. No. 786,188

1 Claim. (Cl. 23—272)

This invention relates to apparatus particularly designed for the treatment and purification of feed water or other liquids before admission thereof to a steam boiler or other container.

It is the general object of the present invention to provide improved apparatus through which such feed water or other liquid may be caused to flow for purification and treatment before the liquid enters the boiler or other container.

Another object of the invention is to provide structure for the efficient removal of dirt or soil from feed water or other liquid flowing through the apparatus, and effective in operation even when the dirt or waste is in substantial amounts. Provision is also made for convenient storage and removal of the waste material.

The apparatus also provides a by-pass construction effective to prevent interruption of service if the treatment apparatus becomes overloaded with waste material.

The invention further relates to arrangements and combinations of parts which will be hereinafter described and more particularly set forth in the appended claim.

A preferred form of the invention is shown in the drawings, in which

Fig. 1 is a side elevation, partly in section, of my improved apparatus;

Fig. 2 is a sectional front elevation, taken along the line 2—2 in Fig. 1; and

Figs. 3 and 4 are transverse sectional views, taken along the lines 3—3 and 4—4 in Fig. 2.

Referring to the drawings, my improved liquid treatment apparatus comprises a cylindrical upright casing 10 mounted on a base 11 and provided with a top flange 12 to which a cover plate 14 may be detachably secured as by screws 15.

The casing 10 has a thickened flange portion or boss 20 at its upper end, and to which an intake-pipe 21 has a threaded connection. The cylindrical casing 10 also has a thickened flange portion or boss 24, which is preferably directly opposite the portion 20, and which is threaded to receive an outlet or discharge pipe 25.

A cylindrical inner member 30 is mounted in spaced relation within the outer casing 10, and is provided with outer ribs 31 which fit freely within the outer casing 10 and center the inner member 30 therein.

A cross-partition 40 is located at right angles to the intake and outlet pipes 21 and 24, and this partition is firmly secured in the cylindrical member 30, thus dividing the inner space in said member 30 into separated vertical space portions A and B.

In its upper part, the cross member 40 is provided with an upwardly elongated opening 42, which permits free flow from the portion A to the portion B in the upper part of the member 30 but permits no cross flow in the lower part of the apparatus.

Vertical outer flanges 44 and 45 on the member 30 are in alignment with the inner partition 40. These members 44 and 45 extend downward below the closed bottom 46 of the inner member 30, and at their lower ends are connected by a transverse upright member 48 which completes a diametrical partition which normally separates the intake and outflow spaces A and B.

The bottom space at the sides of the upright member 48 provides storage for dirt or waste material passing through the apparatus, and a clean-out plug 49 is provided for convenient removal of such waste material.

The inner cylindrical member 30 is provided with a plurality of cross openings 50, permitting flow from the intake pipe 21 to the space A within the inner member 30.

The lowermost holes 50 are preferably raised substantially above the bottom 46 of the inner member, so as to provide additional storage for dirt or other waste material which may have passed in through the openings 50.

In the use of the apparatus, the liquid to be treated enters through the pipe 21 and flows downward through the semi-cylindrical annular space 53 (Fig. 2) between the outer and inner members 10 and 30. The liquid then flows through the openings 50 and upward through the space A to the cross passage 42.

The vertical spaces A and B are commonly filled with coarse granular or crystalline treatment material, such as water glass, and the feed water or other liquid receives the desired treatment as it flows upward through the space A and then downward through the space B to the lower rear outlet openings 60. The liquid then flows upwardly through the semi-annular passage 62 and the treated liquid finally passes out through the outlet or discharge pipe 25.

This is the usual method of operation of the apparatus if the waste material is removed at suitable and frequent intervals. But if the waste material is allowed to accumulate in too large an amount, so that free flow through the openings 50 or 60 cannot take place, the liquid will then flow around the outside of the cylinder 30 and over the upper end of the outer rib 45 to the outlet pipe 25.

At its upper end, the inner cylindrical member 30 has flange portions 70 and 71 by which the member 30 is centered at its upper end. The flange 70 is notched at 72 to receive a short rib 73 which projects inward from the upper end of the outer member 10 and which thus holds the inner member in the desired angular relation to the intake and outlet openings.

The flanges 70 and 71 are cut away at both ends as indicated at 75 in Fig. 3 to provide free passage to the extreme upper end of the unit and both in front of and behind the partitioning ribs 44 and 45.

Having thus described my invention and the advantages thereof, I do not wish to be limited to the details herein disclosed, otherwise than as set forth in the claim, but what I claim is:

Liquid treatment apparatus comprising a substantially cylindrical outer container having intake and outlet passages to admit and remove liquid at separated points in the extreme upper part of said apparatus, an inner cylindrical upright member which is transversely slotted in its lower side wall portions, said cylindrical member being closed at its lower end and having an upright transverse central dividing partition therein which has a transverse opening therethrough in its upper end portion only, said inner member having outer upright flanges aligned with said central partition and normally preventing direct intake and outlet flow around said cylinder, one of said upright flanges being shortened at its upper end to provide emergency flow thereover and around the upper end of said inner cylindrical member from the intake to the outlet for emergency purposes, and the bottom of the inner member being upwardly spaced from the bottom of the outer cylinder to provide storage space for waste material below said inner member, and said storage space having a normally-closed cleaning opening thereto in the bottom of the outer container.

References Cited in the file of this patent

UNITED STATES PATENTS 2,745,550     Atkinson  ---------------- May 15, 1956